United States Patent [19]

Yamanaka et al.

[11] Patent Number: 5,270,381

[45] Date of Patent: Dec. 14, 1993

[54] THERMOPLASTIC ELASTOMER COMPOSITION OF CRYSTALLINE CHLORINATED POLYETHYLENE

[75] Inventors: Masahiro Yamanaka; Kazuya Hori; Hiroyuki Mori; Naoki Ichikawa; Mizuo Washimi, all of Nagoya, Japan

[73] Assignee: Mitsubishi Kasei Vinyl Company, Tokyo, Japan

[21] Appl. No.: 879,932

[22] Filed: May 8, 1992

[30] Foreign Application Priority Data

| May 10, 1991 | [JP] | Japan | 3-105959 |
| Jun. 24, 1991 | [JP] | Japan | 3-151870 |
| Mar. 6, 1992 | [JP] | Japan | 4-049762 |
| Mar. 6, 1992 | [JP] | Japan | 4-049763 |

[51] Int. Cl.$^5$ .............. C08L 27/24; C08K 5/52; C08K 5/12; C08K 3/26

[52] U.S. Cl. .................. 524/569; 524/140; 524/141; 524/144; 524/145; 524/296; 524/297; 524/427; 524/445; 524/519; 525/239; 525/334.1

[58] Field of Search ............... 524/140, 141, 144, 145, 524/296, 297, 519, 569, 425, 427, 445; 525/239, 334.1

[56] References Cited

U.S. PATENT DOCUMENTS

| 4,280,940 | 7/1981 | Klug et al. ............ 524/527 |
| 4,508,640 | 4/1985 | Kanda et al. .......... 524/496 |
| 4,562,224 | 12/1985 | Busch et al. .......... 524/576 |
| 4,763,133 | 8/1988 | Takemura et al. ...... 343/912 |
| 4,772,496 | 9/1988 | Maeda et al. ......... 428/461 |
| 4,861,288 | 8/1989 | Friedman et al. ...... 439/736 |
| 5,051,477 | 9/1991 | Yu et al. ............. 524/528 |

FOREIGN PATENT DOCUMENTS

| 0686201 | 5/1964 | Canada ............... 524/569 |
| 0336735 | 10/1989 | European Pat. Off. . |
| 0154442 | 12/1979 | Japan ................ 524/140 |
| 0219246 | 11/1985 | Japan ................ 524/140 |
| 0190544 | 8/1986 | Japan ................ 524/140 |
| 0168462 | 7/1988 | Japan ................ 524/140 |

OTHER PUBLICATIONS

Database WPIL, AN 86-256034, & JP-A-61-185 553, Aug. 19, 1986, "Thermoplastic Elastomer Composition Obtain MIX PVC Halogenated Polyephylene Alpha Polyolefin Copolymer Material Insoluble Carbon Tetra Chloride Plasticised".

Primary Examiner—Paul R. Michl
Assistant Examiner—Peter Szekely
Attorney, Agent, or Firm—Oblon, Spivak, McClelland, Maier & Neustadt

[57] ABSTRACT

A thermoplastic elastomer composition comprising, as the main blend components, 100 parts by weight of a crystalline chlorinated polyethylene with a chlorination degree of from 20 to 45% and a heat of crystal fusion of from 5 to 35 cal/g as measured by a DSC method and from 10 to 75 parts by weight of a plasticizer.

14 Claims, No Drawings

THERMOPLASTIC ELASTOMER COMPOSITION OF CRYSTALLINE CHLORINATED POLYETHYLENE

The present invention relates to a thermoplastic elastomer composition having good compression set, low temperature properties, blocking resistance and scratch resistance as well as excellent moldability.

With respect to elastomer materials, there has been an increasing demand for improvement of their properties year by year. Particularly, in the field of automobiles, excellent compression set is demanded for materials of e.g. glass runs, weather strips and flush-mount-moles.

Heretofore, soft vinyl chloride resins have been widely used as such materials, since they have flexible rubber-like texture and they are superior to vulcanized rubber in the moldability, weather resistance and tinting properties, and they have an advantage also from the viewpoint of costs. However, they are inferior to vulcanized rubber in the compression set, and their softening point is low, whereby their application for high temperatures has been limited. An attempt has been made for improvement by modifying the vinyl chloride resins to have high degrees of polymerization, but no satisfactory results have been obtained.

Various proposals have also been made to improve the compression set by adding nitrile rubbers having cross-linked structures to vinyl chloride resins. However, such compositions are inferior in the processability, and it has been difficult to satisfy the compression set and the weather resistance simultaneously.

Further, Japanese Unexamined Patent Publication No. 20547/1987 discloses an attempt to improve the compression set by using a chlorinated polyethylene and a vinyl chloride resin as resin components. However, here, it is essential to use a vinyl chloride resin having a carboxyl group in its molecule, which is hardly commercially available and to have the vinyl chloride resin cross-linked, and no adequate compression set will be obtained unless it is cross-linked. The publication does not teach a technical concept of improving the compression set with a composition comprising a chlorinated polyethylene, a commercially available vinyl chloride resin and a plasticizer. Further, this publication does not disclose any effects such as low temperature properties, blocking resistance, scratch resistance and easy moldability.

The present inventors have conducted extensive studies on a method for improving the compression set of a composition comprising a chlorinated polyethylene and a plasticizer, without employing vulcanization or a cross-linking reaction. As a result, they have found it possible to obtain a composition showing excellent compression set, low temperature properties and weather resistance, by kneading a crystalline chlorinated polyethylene having certain specific chlorination degree and heat of crystal fusion and a plasticizer while exerting a shearing force under heating. Further, it has been found that the kneading processability of this composition can be facilitated and various properties such as blocking resistance, scratch resistance, moldability and strain recovery properties can be improved by adding an organic metal phosphate having a specific structure, an inorganic filler or a silicone compound to the composition, particularly when a part of the chlorinated polyethylene obtained by chlorinating a polyethylene having a high molecular weight of more than 200,000 is replaced by a vinyl chloride resin.

Namely, it is an object of the present invention to provide a thermoplastic elastomer composition having excellent compression set, low temperature properties, weather resistance, blocking resistance, scratch resistance, moldability and strain recovery properties.

Thus, the present invention provides a thermoplastic elastomer composition comprising, as the main blend components, 100 parts by weight of a crystalline chlorinated polyethylene with a chlorination degree of from 20 to 45% and a heat of crystal fusion of from 5 to 35 cal/g as measured by a DSC method and from 10 to 75 parts by weight of a plasticizer. Further, when a crystalline chlorinated polyethylene having an oil absorption of at least 25 as measured by using di-2-ethylhexyl phthalate (DOP) as the oil, is selected for use as the above crystalline chlorinated polyethylene, the bleeding resistance, blocking resistance and moldability can be improved. Further, when a crystalline chlorinated polyethylene prepared from a polyethylene having a high molecular weight of at least 100,000, is selected, the strength of a molded product prepared from the composition of the present invention will be improved. However, if the molecular weight exceeds 200,000, the melt viscosity tends to be high, and the processability and moldability tend to be poor. In such a case, a chlorinated polyethylene prepared by chlorinating a polyethylene having a low molecular weight, or a vinyl chloride resin may be incorporated to improve such properties. Especially when a vinyl chloride resin is added to the chlorinated polyethylene prepared from a polyethylene having a molecular weight of more than 200,000 and not more than 750,000, various properties such as low temperature properties, scratch resistance and moldability can remarkably be improved, and bleeding of the plasticizer can be prevented.

The molecular weights referred to above, as well as those in the subsequent disclosure and examples, are expressed as weight average molecular weights.

Now, the present invention will be described in detail.

The crystalline chlorinated polyethylene to be used in the present invention is required to have a chlorination degree of from 20 to 45% and a heat of crystal fusion of from 5 to 35 cal/g, preferably from 5 to 25 cal/g, as measured by a DSC method. This range of the heat of crystal fusion corresponds to a polyethylene crystal residue i.e. a so-called crystallinity within a range of from 10 to 75%, preferably from 10 to 50%. The heat of crystal fusion as measured by a DSC method (differential scanning calorimetry) is the value calculated from the total area of crystal peaks of the DSC chart as measured at a temperature raising rate of 10° C./min by a differential scanning calorimeter, and the value being less than 5 cal/g indicates that there is no substantial remaining crystal.

Further, the crystal melting point as measured by a DSC method, which will be mentioned hereinafter, is a temperature of the maximum peak among all crystal peaks at the time of measuring the heat of crystal fusion by a DSC method. The crystal melting point of the chlorinated polyethylene to be used in the present invention is usually within a range of from 110° to 140° C.

If the chlorination degree of the chlorinated polyethylene is less than 20%, the compatibility with the plasticizer tends to be poor, whereby it will be difficult to lower the hardness, and the weather resistance tends to be poor. On the other hand, if it exceeds 45%, the rubber elasticity tends to be low, and the desired compression set and low temperature properties tend to be hardly obtained. Further, if the heat of crystal fusion is less than 5 cal/g, no adequate effect for improvement of the compression set tends to be obtained. On the other hand, if it exceeds 35 cal/g, it tends to be difficult to lower the hardness, and the processability tends to be remarkably poor.

The chlorinated polyethylene to be used in the present invention preferably has a DOP oil absorption of at least 25, as measured by using di-2-ethylhexyl phthalate (DOP) as the oil. For the determination of the DOP oil absorption, DOP is gradually added to 100 g of the chlorinated polyethylene powder at a temperature of 23° C. under stirring, and the DOP absorption is represented by the volume (ml) of added DOP when the chlorinated polyethylene powder has conglomerated. The DOP oil absorption being at least 25 means that even when 25 ml of DOP is added, the chlorinated polyethylene powder still remains to be in a powder form without forming a conglomerate, or any conglomerate formed may readily be disintegrated by a slight force or impact. Its measurement was conducted in accordance with JIS K 5101. It should be mentioned that chlorinated polyethylene presently commercially available would conglomerate before the addition of DOP reaches 25 ml, i.e. its DOP oil absorption is less than 25.

It is possible to improve the low temperature properties, blocking resistance and extrusion moldability of the resulting thermoplastic elastomer composition by using a chlorinated polyethylene having a DOP oil absorption of at least 25. The mechanism for this improvement is not clearly understood. However, it is believed that such a crystalline chlorinated polyethylene contains little low molecular weight substances or tacky substances, whereby no bleeding phenomenon will occur, or there will be no substantial adverse effects by bleeding of such low molecular weight substances, etc.

Further, if the molecular weight of a polyethylene before chlorination is less than 100,000, the elastomer composition using the resulting chlorinated polyethylene tends to have poor tensile strength. When the molecular weight is not more than 200,000, blocking resistance and scratch resistance may not be adequate, and sticking or bridging of the elastomer composition pellets tends to occur during the molding, or the surface of the molded product tends to be tacky or susceptible to scratching by abrasion such as brushing. When the polyethylene is of a high molecular weight, physical properties such as tensile strength and scratch resistance of the elastomer composition using the resulting chlorinated polyethylene will be improved. However, if the molecular weight exceeds 750,000, the processability of the elastomer composition using the resulting chlorinated polyethylene will be remarkably poor, and in order to improve the processability, it will be necessary to add large amounts of a vinyl chloride resin and a plasticizer, and the feature of the high molecular weight chlorinated polyethylene will be impaired. Accordingly, in the present invention, it is preferred to employ a chlorinated polyethylene prepared by chlorination of a polyethylene having a molecular weight of more than 200,000 and not more than 750,000 (this will be referred to in this specification as a high molecular weight chlorinated polyethylene). Such chlorinated polyethylene is poor in the moldability. Therefore, it is usually employed in combination with a chlorinated polyethylene prepared by chlorination of a polyethylene having a molecular weight of not more than 200,000 (this will be hereinafter referred to as a low molecular weight chlorinated polyethylene) or a vinyl chloride resin.

The amount of such a vinyl chloride resin or a low molecular weight chlorinated polyethylene is preferably from 10 to 40% by weight based on the total amount including the high molecular weight chlorinated polyethylene. Namely, from 90 to 55 parts by weight of the high molecular weight chlorinated polyethylene and from 10 to 45 parts by weight of the vinyl chloride resin or the low molecular weight chlorinated polyethylene are mixed so that the resin components constitute 100 parts by weight. Of course, the vinyl chloride resin and the low molecular weight chlorinated polyethylene may be used in combination. The vinyl chloride resin may be a vinyl chloride homopolymer, a vinyl chloride vinyl acetate copolymer, a vinyl chloride-ethylene copolymer, a vinyl chloride-ethylene-vinyl acetate copolymer, or a vinyl chloride graft copolymer obtained by graft-polymerizing vinyl chloride to an ethylene-propylene copolymer. It is preferred to employ the one having an average degree of polymerization of from 400 to 4,000, preferably from 1,000 to 3,000, more preferably from 1,200 to 2,500, as measured in accordance with JIS K6721.

The plasticizer as an essential component of the thermoplastic elastomer composition of the present invention is not particularly limited, so long as it is commonly used for vinyl chloride resins, and it may, for example, be a phthalate plasticizer such as di-2-ethylhexyl phthalate, di-n-octyl phthalate, diisodecyl phthalate, dibutyl phthalate or dihexyl phthalate; a straight chain dibasic acid ester plasticizer such as dioctyl adipate, or dioctyl sebacate; a trimellitate plasticizer; a polyester polymer plasticizer; an epoxy plasticizer such as epoxidized soybean oil, epoxidized linseed oil or an epoxy resin; a phosphate plasticizer such as triphenyl phosphate, trixylyl phosphate or tricresyl phosphate. These plasticizers may be used alone or in combination as a mixture of two or more of them.

The amount of the plasticizer is suitably determined depending upon the types of resin components, their proportions, other additives or the desired hardness of the product. It is usually selected within a range of from 10 to 75 parts by weight per 100 parts by weight of the resin components. Particularly preferred is an amount within a range of from 15 to 70 parts by weight. If the plasticizer is too little, it tends to be difficult to obtain a product of low hardness. On the other hand, if it is excessive, it tends to be difficult to suppress the bleeding.

To the elastomer composition of the present invention, an inorganic filler may be added within a range not to impair the compression set and low temperature properties. In a case where a large amount of a plasticizer is incorporated to the resin component such as the chlorinated polyethylene, it is effective to add an inorganic filler to prevent bleeding of the plasticizer and to improve the processability in e.g. roll kneading. As the inorganic filler, a common inorganic powder such as calcium carbonate, clay or talc may be employed. It is used usually within a range of not more than 100 parts by weight, preferably from 10 to 60 parts by weight, per 100 parts by weight of the resin components.

Further, it is possible to improve the scratch resistance of the elastomer composition by adding a silicone compound such as polydimethylsiloxane, polymethylphenylsiloxane, polydiphenylsiloxane, polydimethylmethylphenylsiloxane, polydimethyldiphenylsiloxane or polymethylhydrodienesiloxane, to the elastomer composition of the present invention. The amount of its addition is preferably within a range of from 0.1 to 10 parts by weight per 100 parts by weight of the resin components.

To the elastomer composition of the present invention, an organic metal phosphate of the following formula (1) or (2) may preferably be incorporated:

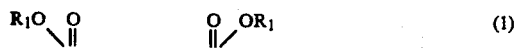  (1)

  (2)

Each of $R_1$ and $R_2$ of the organic metal phosphates of the formulas (1) and (2) may, for example, be an alkyl group such as a methyl group, an ethyl group, an (iso)propyl group, an (iso)butyl group, a neopentyl group, an (iso)hexyl group, an (iso)octyl group, a decyl group, a lauryl group, a tridecyl group, a stearyl, a cyclohexyl group or a cyclodecyl group, an aryl group such as a phenyl group or a naphthyl group, an arylalkyl group such as a benzyl group, a $\beta$-phenylethyl group, an $\beta$-phenylpropyl group or a $\beta$-phenylpropyl group, an alkylaryl group such as a tolyl group, a xylyl group, an ethylphenyl group, a butylphenyl group, a tert-octylphenyl group, a nonylphenyl group or a 2,4-tert-butylphenyl group, or an alkyl group having an ether bond, such as a furfuryl group, a tetrahydrofurfuryl group, a 5-methylfurfuryl group or an $\alpha$-methylfurfuryl group.

It may further be a residue of a cellosolve, such as methylcellosolve, ethylcellosolve, cyclohexylcellosolve or phenyl cellosolve, a residue of an ether such as dimethyl ether, methylethyl ether, methylhexyl ether, dicyclohexyl ether or butylcyclohexyl ether, a residue of a glycerol ether such as glycerol-1,2-dimethyl ether or glycerol-1,3-dimethyl ether, or a residue of a polyethoxyethyl such as nonylphenoxypolyethoxyethyl or lauroxypolyethoxyethyl.

M is zinc, magnesium, calcium, barium, cobalt or strontium.

The organic metal phosphates are produced usually in the form of a mixture of compounds having the formulas (1) and (2), and such a mixture is used without separating the compounds.

The organic metal phosphate is incorporated usually in an amount within a range of from 0.1 to 10 parts by weight, preferably from 0.2 to 5 parts by weight, per 100 parts by weight of the resin components including the chlorinated polyethylene. If the amount is less than 0.1 part by weight, the composition tends to adhere to a kneader during the kneading of the composition, the effect for improving the processability is small, and no adequate effect for improving the weather resistance can be expected. On the other hand, even if it is used in an amount of more than 10 parts by weight, no adequate improvement proportional to the additional amount will be obtained. Therefore, it is advisable to use the organic metal phosphate within the above range also from the economical viewpoint.

To the thermoplastic elastomer composition of the present invention, various additives such as a stabilizer, a lubricant, an antioxidant, an ultraviolet absorber, a blowing agent, a flame retardant, a pigment and an impact resistance-improving agent, may be incorporated, as the case requires.

To prepare the thermoplastic elastomer composition of the present invention, the resin components including the chlorinated polyethylene, etc. and the plasticizer are kneaded, if necessary together with the above mentioned various additives, under a shearing force while heating at a temperature of at least the crystal melting point of the crystalline chlorinated polyethylene. By kneading under such conditions, it is possible to obtain an elastomer composition which is excellent in the compression set, low temperature properties, blocking resistance and the moldability. If the temperature is lower than the crystal melting point, the plasticizer would penetrate only at the amorphous portions of the crystalline chlorinated polyethylene, whereby there will be no substantial change in the crystal structure after kneading. Whereas, when the mixture is kneaded under a shearing force while being heated at a temperature of at least the crystal melting point, it is believed that the plasticizer penetrates also to the crystal portions, whereby a new network structure will be formed among molecular chains when the chlorinated polyethylene is recrystallized, and the rubber elasticity such as compression set will thereby be improved.

Further, it is believed that when the molecular weight of the chlorinated polyethylene is large, a large amount of the plasticizer can be contained among the molecular chains, whereby the blocking resistance will be improved, and the low temperature properties will be excellent.

An apparatus to be used for mixing the above described blend components, may be any apparatus so long as it is capable of uniformly mixing them. For example, it may be a Henschel mixer, a ribbon blender or a planetary mixer. To knead the mixture, an apparatus capable of kneading it under a shearing force under heating, such as an extruder, a roll mill, a Banbury mixer or a kneader, can be used. As a kneading method, it is possible to employ a method wherein an extruder having a multistage inlets, is used so that in an earlier stage the resin components and various additives are introduced, and at a later stage, the plasticizer is introduced. The upper limit of the heating temperature is preferably within a range where a heat deterioration of the chlorinated polyethylene is negligible specifically not higher than 210° C. Further, the kneading temperature is usually within a range of from 130° to 210° C., preferably from 150° to 200° C.

Now, the present invention will be described in further detail with reference to Examples. However, it should be understood that the present invention is by no means restricted to such specific Examples.

In these Examples, "parts" and "%" mean "parts by weight" and "% by weight", respectively, unless otherwise specified.

Further, various properties of the thermoplastic elastomer composition were evaluated as follows.

Hardness

With respect to the same test piece as used for the measurement of the compression set, the hardness was measured in accordance with JIS K6301 (JIS A hardness).

Compression set

Measured in accordance with JIS K6301 at 70° C. for 22 hours under a compression of 25%.

Low temperature properties

The low temperature properties are represented by the temperature at which the apparent modulus of elasticity in torsion becomes to be $1.0 \times 10^3$ kg/cm² in the method for testing a low temperature torsion in accordance with JIS K6301.

Bleeding

The same test piece as used for the measurement of compression set, was left to stand for one week in a constant temperature and humidity chamber at 50° C. under a relative humidity of 60%, and then left to stand at 23° C. for one hour, whereupon bleeding on the surface was visually observed. The evaluation was made based on the following standards.
○: No bleeding
×: Bleeding observed Weather resistance The color change of a test piece after exposure by a sunshine weatherometer for 1,000 hours, was visually observed and evaluated. The evaluation was made under the following standards.
○: No color change
×: Colored brown Processability The composition prepared by mixing in a beaker was charged into a Brabender Plastograph and kneaded for a predetermined period of time, whereupon the degree of adhesion to the cell and to the rotor was visually evaluated.
: The viscosity is proper; easily processable; no adhesion to the machine; excellent releasability.
○: The viscosity is proper; easily processable; no adhesion to the machine; but releasability is somewhat poor.
× The viscosity is so high that the processability is poor or adhesion to the machine is observed.

Tensile strength

In accordance with JIS K6301, a JIS No. 1 dumbbell specimen was punched out from a sheet, and the breaking strength was measured using a tensilon tensile tester UTM-III-100 at 23° C. at a tensile rate of 200 mm/min with a chuck-distance of 20 mm.

Blocking resistance

Two sheets each having a thickness of 1 mm (20 mm × 100 mm) were overlaid to each other and heat-treated at 40° C. for two hours and then left to stand at 20° C. for 30 minutes. Peeling of these two sheets was evaluated in accordance with the following three ratings.
○: Peeling excellent
Δ: Peeling difficult or not easy
×: Adhered to each other and can not be peeled Moldability An L-form die was attached to a 40 mm extruder (L/D =24), and contour extrusion was conducted at a die temperature of 180° C. The surface condition or edge damage of the molded product was visually evaluated.
○: Surface condition good and no edge damage observed.
Δ: Surface condition poor or edge damage observed.
×: Surface condition poor and substantial edge damage observed.

Strain recovery

Using an autograph (DCS-2000 model, manufactured by Shimadzu Corporation), a reference line of 50 mm was marked on a sheet having a thickness of 1 mm, a width of 5 mm and a length of 100 mm, and the sheet was stretched 200% at 23° C. at a rate of 1,000 mm/min, and in that state, was held for 10 minutes. Then, the sheet was detached from the chuck, and 30 seconds later, the length of the reference line was measured. The recovery was calculated from the measured value in accordance with the following formula. When mounted on an automobile, the one with this recovery being more than 80% provides an effect of preventing a squeaking sound.

$$[1-(l-L_0)/L_0] \times 100(\%)$$

$L_0$: Initial length (50 mm), L: Length after the tests.

Scratch resistance

On a sheet having a thickness of 1 mm, a bleached cloth was receprocated ten times under a load of 40 g/cm² in a distance of 50 mm, whereby the scratching state was visually evaluated in accordance with the following four ratings.
⊚: No scratching observed
○: Slight scratching observed
Δ: Distinct scratching observed
×: Deep scratching observed

EXAMPLES 1 TO 18 AND COMPARATIVE EXAMPLES 1 TO 3

The chlorinated polyethylene (CPE), plasticizer, inorganic filler (filler) and organic metal phosphate (phosphate) of the types and amounts (parts by weight) as identified in Table 1, and 2 parts of a lead type powder stabilizer were mixed in a beaker, and the mixture was kneaded by a Brabender Plastograph at a cell temperature of 150° C. at 50 rpm for 10 minutes and further kneaded by mill rolls at a surface temperature of 130° C. for 5 minutes to obtain a sheet. This sheet was further pressed at 180° C. for 5 minutes to obtain a test piece having a predetermined thickness. With respect to this test piece, the above evaluation of various properties was conducted.

TABLE 1

| | CPE*1 | | Plasticizer*2 | | Filler*3 | | Phosphate*4 | |
|---|---|---|---|---|---|---|---|---|
| | Type | Amount | Type | Amount | Type | Amount | Type | Amount |
| Examples | | | | | | | | |
| 1 | A | 100 | L | 20 | | | | |
| 2 | A | 100 | L | 40 | | | | |
| 3 | B | 100 | L | 40 | | | | |
| 4 | A | 100 | M | 35 | | | | |
| 5 | A | 100 | N | 50 | | | | |
| 6 | A | 100 | L | 40 | P | 20 | | |
| 7 | A | 100 | L | 45 | P | 50 | | |
| 8 | B | 100 | L | 40 | P | 20 | | |
| 9 | A | 100 | N | 55 | P | 50 | | |
| 10 | A | 100 | L | 40 | Q | 20 | | |

TABLE 1-continued

|    | CPE*1 |        | Plasticizer*2 |        | Filler*3 |        | Phosphate*4 |        |
|----|-------|--------|---------------|--------|----------|--------|-------------|--------|
|    | Type  | Amount | Type          | Amount | Type     | Amount | Type        | Amount |
| 11 | A     | 100    | L             | 40     |          |        | X           | 2      |
| 12 | A     | 100    | L             | 40     |          |        | X           | 5      |
| 13 | B     | 100    | L             | 40     |          |        | X           | 2      |
| 14 | A     | 100    | N             | 50     |          |        | X           | 2      |
| 15 | A     | 100    | L             | 40     |          |        | Y           | 2      |
| 16 | A     | 100    | L             | 40     | P        | 30     | X           | 1      |
| 17 | A     | 100    | L             | 40     | Q        | 30     | X           | 1      |
| 18 | B     | 100    | N             | 55     | P        | 30     | Y           | 1      |
| Comparative Examples | | | | | | | | |
| 1  | A     | 100    |               |        |          |        |             |        |
| 2  | A     | 100    | L             | 100    |          |        |             |        |
| 3  | C     | 100    | L             | 40     |          |        |             |        |

*1: Chlorinated polyethylene (all manufactured by Syowa Denko K.K.)
A: ELASLEN ® 303B (molecular weight of polyethylene: 70,000, chlorination degree: 30%, heat of crystal fusion: 12 cal/g, crystal melting point: 123° C.)
B: ELASLEN ® 303C (chlorination degree: 30%, heat of crystal fusion: 20 cal/g, crystal melting point: 127° C.)
C: ELASLEN ® 401A (chlorination degree: 40%, heat of crystal fusion: not more than 0.5 cal/g, non-crystalline)
*2: Plasticizer (all manufactured by Mitsubishi Kasei Vinyl Company)
L: Di-2-ethylhexyl phthalate (DOP)
M: Di-isononyl adipate
N: adipic acid-type polyester (Diacizer ® D-643)
*3: Filler
P: Calcium carbonate (Soften, tradename, manufactured by Bihoku Funka)
Q: Talc (PH talc, tradename, manufactured by Takehara Kagaku)
*4: Phosphate
X: Zinc stearyl phosphate
Y: Barium palmityl phosphate

TABLE 2

|          | Hardness | Compression set | Bleeding | Weather resistance | Processability |
|----------|----------|-----------------|----------|--------------------|----------------|
| Examples |          |                 |          |                    |                |
| 1        | 62       | 40              | ○        | ○                  | ○              |
| 2        | 51       | 34              | ○        | ○                  | ○              |
| 3        | 74       | 33              | ○        | ○                  | ○              |
| 4        | 52       | 37              | ○        | ○                  | ○              |
| 5        | 51       | 35              | ○        | ○                  | ○              |
| 6        | 53       | 39              | ○        | ○                  | ○              |
| 7        | 51       | 35              | ○        | ○                  | ○              |
| 8        | 72       | 38              | ○        | ○                  | ○              |
| 9        | 50       | 35              | ○        | ○                  | ○              |
| 10       | 52       | 38              | ○        | ○                  | ○              |
| 11       | 51       | 34              | ○        | ○                  | ◉              |
| 12       | 52       | 35              | ○        | ○                  | ◉              |
| 13       | 71       | 35              | ○        | ○                  | ◉              |
| 14       | 50       | 34              | ○        | ○                  | ◉              |
| 15       | 51       | 35              | ○        | ○                  | ◉              |
| 16       | 54       | 37              | ○        | ○                  | ◉              |
| 17       | 55       | 37              | ○        | ○                  | ◉              |
| 18       | 73       | 35              | ○        | ○                  | ◉              |
| Comparative Examples | | | | | |
| 1        | 75       | 52              | ○        | ○                  | ○              |
| 2        | —        | Not processable | —        | —                  | —              |
| 3        | 35       | 90              | ○        | ○                  | ○              |

EXAMPLES 19 TO 27 AND COMPARATIVE EXAMPLES 4 AND 5

The chlorinated polyethylene (CPE), plasticizer, inorganic filler (filler) and organic metal phosphate (phosphate) of the types and amounts (parts by weight) as identified in Table 3, and 2 parts of a lead-type powder stabilizer were mixed in a beaker, and the mixture was kneaded by a Brabender Plastograph at a cell temperature of 150° C. at 50 rpm for 10 minutes and further kneaded by mill rolls at a surface temperature of 130° C. for 5 minutes to obtain a sheet. This sheet was further pressed at 180° C. for 5 minutes to obtain a test piece having a predetermined thickness. With respect to this test piece, the above evaluation of various properties was conducted. The results are shown in Table 4.

TABLE 3

|          | CPE*5 |        | Plasticizer |        | Filler |        | Phosphate |        |
|----------|-------|--------|-------------|--------|--------|--------|-----------|--------|
|          | Type  | Amount | Type        | Amount | Type   | Amount | Type      | Amount |
| Examples |       |        |             |        |        |        |           |        |
| 19       | D     | 100    | L           | 40     |        |        |           |        |
| 20       | E     | 100    | L           | 40     |        |        |           |        |
| 21       | E     | 100    | L           | 20     |        |        |           |        |
| 22       | E     | 100    | L           | 45     | P      | 50     |           |        |
| 23       | E     | 100    | L           | 40     |        |        | X         | 2      |
| 24       | E     | 100    | L           | 40     | P      | 30     | X         | 1      |
| 25       | E     | 100    | M           | 40     |        |        |           |        |
| 26       | E     | 100    | L           | 45     | Q      | 50     |           |        |
| 27       | E     | 100    | L           | 40     | P      | 30     | Y         | 1      |
| Comparative Examples | | | | | | | | |
| 4        | F     | 100    | L           | 40     |        |        |           |        |

TABLE 3-continued

|   | CPE*5 | | Plasticizer | | Filler | | Phosphate | |
|---|---|---|---|---|---|---|---|---|
|   | Type | Amount | Type | Amount | Type | Amount | Type | Amount |
| 5 | E | 100 | L | 100 | | | | |

*5 Chlorinated polyethylene (all manufactured by Syowa Denko K.K.)
D: ELASLEN ® 202B (molecular weight of polyethylene: 120,000, chlorination degree: 23%, heat of crystal fusion: 17 cal/g, crystal melting point: 125° C.)
E: ELASLEN ® 302B (molecular weight of polyethylene: 120,000, chlorination degree: 31%, heat of crystal fusion: 13 cal/g, crystal melting point: 125° C.)
F: ELASLEN ® 302NA (molecular weight of polyethylene: 120,000, chlorination degree: 31%, heat of crystal fusion: not more than 0.5 cal/g, non-crystalline)

COMPARATIVE EXAMPLE 6

To 100 parts of a vinyl chloride resin having a average degree of polymerization of 2,500, 100 parts of a plasticizer (DOP), 100 parts of partially cross-linked NBR having a solubility in tetrahydrofuran (THF) of 20% and 3 parts of dibutyl tin maleate, were mixed, and the mixture was kneaded at 180° C. for 10 minutes by mill rolls to obtain a sheet.

This sheet was processed in the same manner as in Example 19 to obtain a pressed test piece, which was used for evaluation of the various properties. The results of the evaluation are shown in Table 4.

TABLE 4

|   | Hardness | Compression set | Bleeding | Weather resistance | Processability | Tensile stength (kg/cm²) |
|---|---|---|---|---|---|---|
| Examples | | | | | | |
| 19 | 70 | 40 | ○ | ○ | ○ | 138 |
| 20 | 58 | 29 | ○ | ○ | ○ | 126 |
| 21 | 70 | 33 | ○ | ○ | ○ | 162 |
| 22 | 58 | 30 | ○ | ○ | ○ | 101 |
| 23 | 58 | 29 | ○ | ○ | ◉ | 127 |
| 24 | 60 | 33 | ○ | ○ | ◉ | 121 |
| 25 | 55 | 28 | ○ | ○ | ○ | 125 |
| 26 | 57 | 31 | ○ | ○ | ○ | 116 |
| 27 | 61 | 32 | ○ | ○ | ◉ | 120 |
| Comparative Examples | | | | | | |
| 4 | 35 | 90 | ○ | ○ | ○ | 88 |
| 5 | — | Not processable | — | — | — | — |
| 6 | 55 | 45 | ○ | X | ◉ | 140 |

EXAMPLE 28 TO 34

The chlorinated polyethylene (CPE), plasticizer, vinyl chloride resin (PVC), inorganic filler (filler) and silicone compound of the types and amounts (parts by weight) as identified in Table 5 and 2 parts of a lead-type powder stabilizer, were mixed by a Henschel mixer at room temperature for 3 minutes, and the mixture was kneaded by a Banbury mixer at a jacket temperature of 160° C. at 85 rpm for 3 minutes and further kneaded by a mill rolls at the surface temperature of 150° C. for 3 minutes to obtain a sheet having a thickness of 2 mm. This sheet was further pressed at 180° C. for 5 minutes to obtain a test piece having a predetermined thickness. With respect to this test piece, the above mentioned evaluation of various properties was conducted, and the results are shown in Table 6.

Further, for the evaluation of the moldability, the sheet having a thickness of 2 mm was cut into pellets by a sheet cut system and then subjected to extrusion molding.

Further, materials used in the following Examples, which were not described above, are shown in Table 7.

TABLE 5

|   | CPE*6 | | Plasticizer*7 | | PVC*8 | | Filler | | Silicone oil*9 | |
|---|---|---|---|---|---|---|---|---|---|---|
|   | Type | Amount | Type | Amount | Type | Amount | Type | Amount | Type | Amount |
| Examples | | | | | | | | | | |
| 28 | G | 100 | L | 20 | | | | | | |
| 29 | H | 100 | L | 40 | | | | | | |
| 30 | H | 100 | L | 55 | S | 25 | | | | |
| 31 | H | 100 | L | 40 | | | P | 30 | | |
| 32 | H | 100 | L | 40 | | | P | 30 | Z | 3 |
| 33 | H | 100 | O | 40 | | | Q | 30 | | |
| 34 | I | 100 | L | 70 | T | 40 | P | 40 | | |

TABLE 6

|   | Hardness | Compression set | Low temperature properties | Blocking resistance | Moldability | Strain recovery |
|---|---|---|---|---|---|---|
| Examples | | | | | | |
| 28 | 67 | 37 | −35 | ○ | ○ | 78 |
| 29 | 54 | 35 | −41 | ○ | ○ | 83 |
| 30 | 61 | 40 | −40 | ○ | ○ | 80 |
| 31 | 56 | 37 | −40 | ○ | ○ | 81 |
| 32 | 59 | 36 | −40 | ○ | ◉ | 80 |
| 33 | 58 | 37 | −40 | ○ | ◉ | 86 |
| 34 | 62 | 33 | −45 | ○ | ○ | 86 |

In addition to the above evaluation results, in Examples 30 and 34 werein PVC was incorporated, the scratch resistance was excellent, and in Example 32 wherein the silicone compound was incorporated, an effect for the improvement of the scratch resistance was also obtained.

Henshel mixer at room temperature for 3 minutes, and the mixture was kneaded by a Banbury mixer at a jacket temperature of 60° C. at 85 rpm for 3 minutes and further kneaded by mill rolls at a surface temperature of 150° C. for 3 minutes to obtain a sheet having a thickness of 2 mm. This sheet was further pressed at 180° C.

TABLE 7

| Type | PE-MW *10 | Chlorination degree | Heat of crystal fusion | Crystal melting point | DOP oil absorption |
|---|---|---|---|---|---|
| G Test sample A | 120,000 | 30% | 10.2 ca/g | 120° C. | at least 50 |
| H Test sample B | 200,000 | 30% | 10.7 | 122 | at least 50 |
| I Test sample C | 350,000 | 30% | 5.4 | 115 | at least 50 |
| J Test sample D | 350,000 | 30% | 9.8 | 125 | at least 50 |
| K Commercial product | 120,000 | 30% | 12.2 | 120 | 20 |

*6 CPE Test samples and commercial products
*7 Plasticizer, manufactured by Mitsubishi Kasei Vinyl Company
O: Commercial product, Di-2-ethylhexyl adipate
*8 PVC, manufactured by Mitsubishi Kasei Vinyl Company
S: Commercial product, Average degree of polymerization: 2350, suspension-polymerizaiton product
T: Commercial product, Average degree of polymerization: 1300, suspension-polymerization product
*9 Silicone compound
Z: Commercial product, Polydimethyl silicone (m.p.: −40° C., second-order transition temp: −123° C.)
*10: Molecular weight of polyethylene before chlorination

EXAMPLES 35 TO 49

The high molecular weight chlorinated polyethylene (HCPE), vinyl chloride resin (PVC), low molecular weight chlorinated polyethylene (LCPE), plasticizer, inorganic filler (filler) and silicone oil of the types and amounts (parts by weight) as identified in Table 8 and 2 parts of a lead-type powder stabilizer were mixed by a for 5 minutes to obtain a test piece having a predetermined thickness. With respect to this test piece, the above mentioned evaluation of various properties were conducted. The results are shown in Table 9.

Further, for the evalution of the moldability, the sheet having a thickness of 2 mm was cut into pellets by a sheet cut system and then subjected to extrusion molding.

TABLE 8

| | HCPE*6 | | PVC*8 | | LCPE*6 | | Plasticizer*7 | | Filler | | Silicone oil*9 | |
|---|---|---|---|---|---|---|---|---|---|---|---|---|
| | Type | Amount | Type | Amount | Type | Amount | Type | Amount | Type | Amount | Type | Amount |
| Examples | | | | | | | | | | | | |
| 35 | J | 60 | S | 40 | | | L | 60 | | | | |
| 36 | J | 70 | T | 30 | | | L | 50 | | | | |
| 37 | J | 80 | S | 20 | | | L | 40 | | | | |
| 38 | J | 80 | T | 20 | | | L | 45 | P | 20 | | |
| 39 | J | 60 | S | 40 | | | O | 60 | Q | 20 | | |
| 40 | J | 70 | T | 30 | | | L | 50 | P | 20 | | |
| 41 | J | 60 | T | 40 | | | L | 60 | | | Z | 3 |
| 42 | I | 70 | S | 30 | | | L | 50 | P | 20 | Z | 3 |
| 43 | J | 80 | | | H | 20 | L | 45 | | | | |
| 44 | J | 60 | | | H | 40 | L | 40 | | | | |
| 45 | J | 60 | | | K | 40 | L | 45 | | | | |
| 46 | J | 70 | | | H | 30 | L | 40 | P | 20 | | |
| 47 | I | 60 | | | H | 40 | L | 45 | P | 30 | | |
| 48 | J | 70 | | | K | 30 | O | 40 | P | 30 | Z | 3 |
| 49 | I | 70 | | | H | 30 | O | 40 | Q | 20 | Z | 3 |

TABLE 9

| | Hardness | Compression set | Low Temperature properties | Blocking resistance | Scratch resistance | Moldability | Strain recovery |
|---|---|---|---|---|---|---|---|
| Examples | | | | | | | |
| 35 | 60 | 38 | −46 | ○ | ⊙ | ○ | 86 |
| 36 | 61 | 35 | −47 | ○ | ⊙ | ○ | 87 |
| 37 | 60 | 33 | −45 | ○ | ⊙ | ○ | 88 |
| 38 | 61 | 34 | −45 | ○ | ⊙ | ○ | 85 |
| 39 | 62 | 39 | −45 | ○ | ⊙ | ○ | 89 |
| 40 | 61 | 32 | −46 | ○ | ⊙ | ○ | 85 |
| 41 | 62 | 30 | −45 | ○ | ⊙ | ○ | 87 |
| 42 | 62 | 32 | −45 | ○ | ⊙ | ○ | 86 |
| 43 | 62 | 32 | −41 | ○ | △ | ○ | 87 |
| 44 | 60 | 34 | −40 | ○ | △ | ○ | 86 |
| 45 | 55 | 36 | −40 | △ | △ | ○ | 82 |
| 46 | 63 | 35 | −41 | ○ | △ | ○ | 85 |
| 47 | 61 | 35 | −40 | ○ | △ | ○ | 87 |
| 48 | 63 | 34 | −41 | ○ | ○ | ○ | 88 |

TABLE 9-continued

| | Hardness | Compression set | Low Temperature properties | Blocking resistance | Scratch resistance | Moldability | Strain recovery |
|---|---|---|---|---|---|---|---|
| | 49 | 62 | 33 | −40 | ○ | ○ | ○ | 89 |

The thermoplastic elastomer composition of the present invention is prepared by kneading a crystalline chlorinated polyethylene having a specific chlorination degree and heat of crystal fusion together with a plasticizer under a shearing force at a temperature higher than the crystal melting point of the crystalline chlorinated polyethylene, whereby it provides excellent compression set and weather resistance without addition of a vulcanizer or cross-linking agent, and the compression set decreases as the amount of the plasticizer increases. Further, by selectively using a chlorinated polyethylene obtained by chlorinating a polyethylene having amolecular weight of at least 100,000, the mechanical properties such as tensile strength can be improved. Further, by using a chlorinated polyethylene with excellent plasticizer absorptivity, having a DOP oil absorption of at least 25, the plasticizer bleeding resistance and blocking resistance can be improved, and the low temperature properties (such as low temperature flexibility) can also be improved.

The chlorinated polyethylene obtained by chlorinating a polyethylene having a molecular weight of more than 200,000 is poor in the kneading processability and moldability even when a plasticizer is added thereto. However, when a chlorinated polyethylene of a low molecular weight or a vinyl chloride resin is used in combination therewith, the kneading processability, moldability and strain recovery can be improved. Especially when a vinyl chloride resin is incorporated, the scratch resistance of the chlorinated polyethylene can remarkably be improved.

By incorporating an inorganic filler, a silicone compound or a specific organic metal phosphate to the thermoplastic elastomer composition of the present invention, the kneading and molding can be facilitated as the composition does not stick to the kneader such as a Banbury mixer, rolls or an extruder during the preparation or molding of the composition, and the bleeding resistance and blocking resistance can also be improved.

The composition of the present invention is useful as a base material for window moldings, glass runs, weather strips or mission covers to be mounted on automobiles, and it is also useful in the field where rubber elasticity is required, such as packings.

We claim:

1. A thermoplastic elastomer composition comprising, as the main blend components, 100 parts by weight of a crystalline chlorinated polyethylene with a chlorination degree of from 20 to 45% and a heat of crystal fusion of from 5 to 35 cal/g as measured by a DSC method and from 10 to 75 parts by weight of a plasticizer, said composition having been prepared by kneading the components of the composition under a shearing force while heating at a temperature of at least the crystal melting point of the crystalline chlorinated polyethylene.

2. The thermoplastic elastomer composition according to claim 1, wherein the crystalline chlorinated polyethylene has a DOP oil absorption of at least 25 as measured by using di-2-ethylhexyl phthalate (DOP) as the oil.

3. The thermoplastic elastomer composition according to claim 1, wherein the crystalline chlorinated polyethylene is the one obtained by chlorinating a polyethylene having a weight average molecular weight of from 100,000 to 750,000.

4. The thermoplastic elastomer composition according to claim 3, wherein the crystalline chlorinated polyethylene is the one obtained by chlorinating a polyethylene having a weight average molecular weight of from 100,000 to 200,000.

5. The thermoplastic elastomer composition according to claim 3, wherein the crystalline chlorinated polyethylene is the one obtained by chlorinating a polyethylene having a weight average molecular weight of more than 200,000 and not more than 750,000.

6. The thermoplastic elastomer composition according to claim 1, wherein the crystalline chlorinated polyethylene is a mixture comprising from 90 to 55 parts by weight of a crystalline chlorinated polyethylene obtained by chlorinating a polyethylene having a weight average molecular weight of more than 200,000 and not more than 750,000 and from 10 to 45 parts by weight of a crystalline chlorinated polyethylene obtained by chlorinating a polyethylene having a molecular weight of not more than 200,000.

7. The thermoplastic elastomer composition according to claim 1, which contains from 10 to 100 parts by weight of an inorganic filler.

8. The thermoplastic elastomer composition according to claim 7, wherein the inorganic filler is calcium carbonate and/or clay.

9. The thermoplastic elastomer composition according to claim 1, which contains from 0.1 to 10 parts by weight of a silicone compound.

10. The thermoplastic elastomer composition according to claim 1, which contains from 0.1 to 10 parts by weight of an organic metal phosphate of the following formula (1) or (2):

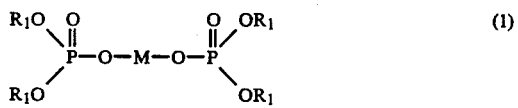

wherein each of $R_1$ and $R_2$ is an alkyl group, an aryl group, an arylalkyl group or an alkyl group having an ether bond, and the plurality of $R_1$ may be the same or different, and M is zinc, magnesium, calcium, barium, cobalt or strontium.

11. A thermoplastic elastomer composition comprising, as the main blend components, 100 parts by weight of a resin component and from 10 to 75 parts by weight of a plasticizer, wherein the resin component comprises from 90 to 55 parts by weight of a crystalline chlorinated polyethylene obtained by chlorinating a polyethylene having a weight average molecular weight of more than 200,000 and not more than 750,000 and with a chlorination degree of from 20 to 45% and a heat of crystal fusion of from 5 to 35 cal/g as measured by DSC method and from 10 to 45 parts by weight of a vinyl chloride resin, said composition having been prepared by kneading the components of the composition under a shearing force while heating at a temperature of at least the crystal melting point of the crystalline chlorinated polyethylene.

12. The thermoplastic elastomer composition according to claim 11, which contains from 10 to 100 parts by weight of an inorganic filler.

13. The thermoplastic elastomer composition according to claim 12, wherein the inorganic filler is calcium carbonate and/or clay.

14. The thermoplastic elastomer composition according to claim 11, which contains from 0.1 to 10 parts by weight of a silicone compound.

* * * * *